United States Patent [19]

Fujishima et al.

[11] Patent Number: 5,783,884
[45] Date of Patent: Jul. 21, 1998

[54] COIL COMPONENTS AND MOTOR USING THE COIL COMPONENTS

[75] Inventors: Makoto Fujishima; Shigeru Kasai; Noriyuki Kawahara, all of Nagano, Japan

[73] Assignee: Sankyo Seiki Mfg. Co., Ltd., Nagano-ken, Japan

[21] Appl. No.: 811,920

[22] Filed: Mar. 5, 1997

[30] Foreign Application Priority Data

Mar. 6, 1996 [JP] Japan ............................ 8-048512

[51] Int. Cl.⁶ .............................. H02K 5/16; H02K 7/08
[52] U.S. Cl. .............................. 310/90; 310/12; 360/78.13
[58] Field of Search ........................... 310/12, 13, 14, 310/90; 360/78.04, 78.13

[56] References Cited

U.S. PATENT DOCUMENTS

| 5,252,871 | 10/1993 | Inoue | 310/90 |
| 5,392,178 | 2/1995 | Nishio et al. | 310/67 R |
| 5,552,650 | 9/1996 | Cap et al. | 310/67 R |

FOREIGN PATENT DOCUMENTS 4-095609  3/1992  Japan.

*Primary Examiner*—Steven L. Stephan
*Assistant Examiner*—Judson H. Jones
*Attorney, Agent, or Firm*—McAulay Fisher Nissen Goldberg & Kiel, LLP

[57] ABSTRACT

A driving motor comprises a rotor having a rotatably supported shaft, a rotor case rotating together with the shaft, a hub seat attached to the rotor case for mounting a disk hub and a chucking magnet for magnetically attracting the disk hub and a thrust ball bearing having a washer, a plurality s of balls and a retainer for holding the balls and supporting the load in the thrust direction of the rotor. The motor also includes a flatness control section which passes through the rotor case to contact the washer of the thrust ball bearing and controls the flatness of the washer and a position control section which passes through the rotor case to contact an inner circle surface of the washer of the thrust ball bearing and controls the washer in the thrust direction. The chucking magnet, flatness control section and position control section are integrally molded of resin.

6 Claims, 2 Drawing Sheets

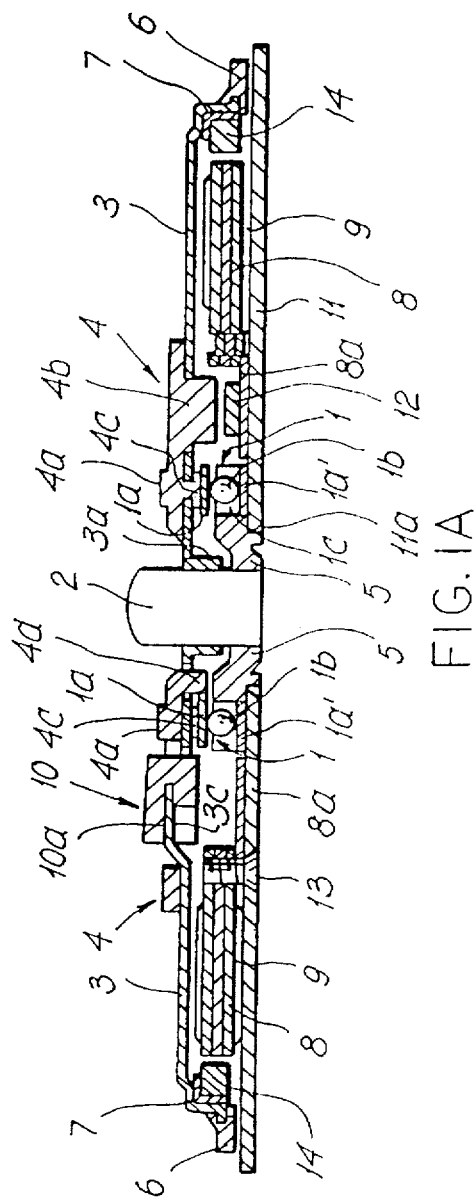
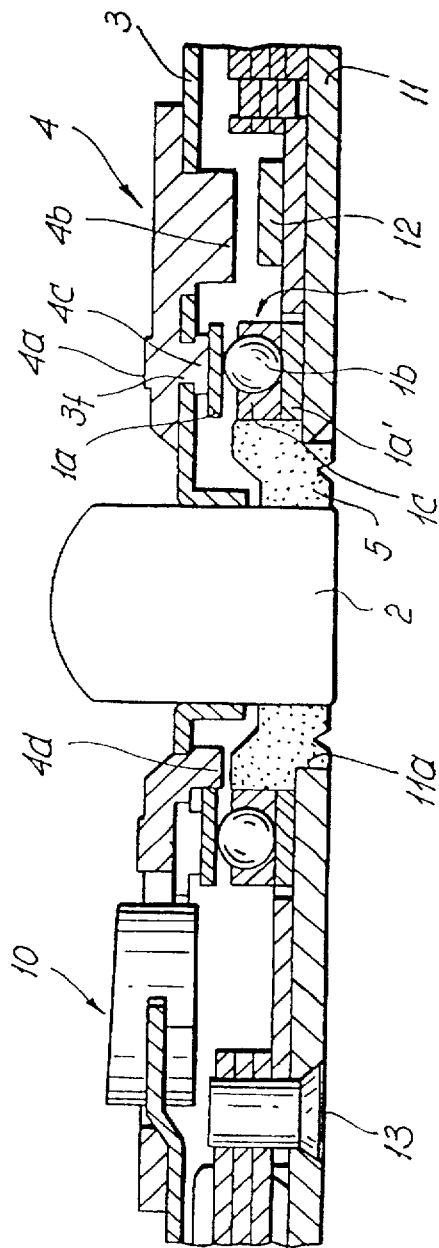

1

COIL COMPONENTS AND MOTOR USING THE COIL COMPONENTS

BACKGROUND OF THE INVENTION a) Field of the Invention

This invention relates to a floppy disk driving motor which is used for driving a floppy disk.

b) Description of the Related Art

One of the popular floppy disk driving motors, which drives a floppy disk secured on a hub seat, is disclosed in Laid-open Japanese Patent (Tokkai) H4-095609. FIG. 4 shows an example of such a floppy disk driving motor. In the motor of FIG. 4, a rotor 20 is rotatably held such that it is supported in the thrust direction by a thrust ball bearing 30, and also supported in the radial direction by a radial bearing 34. As the rotor 20 rotates, balls 31 of the thrust ball bearing 30 rotate around an annular orbit while rotating themselves. The rotor 20, comprising a chucking magnet 21, a drive pin 22, a hub seat, a index magnet (not illustrated), etc., is configured so as to load a floppy disk and rotate together therewith.

In a floppy disk driving motor having such configuration, the inner circle of a retainer 32 for holding the ball 31 is fitted to the outer circumference of a boss section 23a of the hub seat 23 to mount the thrust ball bearing 30. Secure fitting is critical in obtaining accurate rotation for a floppy disk driving motor. Insufficient contact area between the retainer 32 and the boss section 23a of the hub seat 23 makes it difficult to rotate very accurately.

Further, such a floppy disk driving motor is configured such that a chucking magnet 21 for magnetically attracting a floppy disk and an index magnet are mounted with respect to the rotor case 20, thus increasing the number of components, material cost, assembly cost, etc.

OBJECT AND SUMMARY OF THE INVENTION

The primary object of this invention is to solve the aforementioned problems of conventional technology and to provide a floppy disk driving motor which rotates very accurately.

In accordance with the invention, a driving motor comprises a rotor having a rotatably supported shaft, a rotor case rotating together with the shaft, a hub seat attached to the rotor case for mounting a disk hub and a chucking magnet for magnetically attracting the disk hub and a thrust ball bearing having a washer, a plurality of balls and a retainer for holding the balls and supporting the load in the thrust direction of the rotor. The motor also includes a flatness control section which passes through the rotor case to contact the washer of the thrust ball bearing and controls the flatness of the washer and a position control section which passes through the rotor case to contact an inner circle surface of the washer of the thrust ball bearing and controls the washer in the thrust direction. The chucking magnet, flatness control section and position control section are integrally molded of resin.

BRIEF DESCRIPTION OF THE DRAWINGS

In the drawings:

FIG. 1(A) and FIG. 1(B) show a cross-sectional view of an embodiment of a floppy disk drive motor of this invention: FIG. 1(A) is an overall view; FIG. 1(B) is a magnified view of a key section;

DESCRIPTION OF THE PREFERRED EMBODIMENTS

Figure 2:
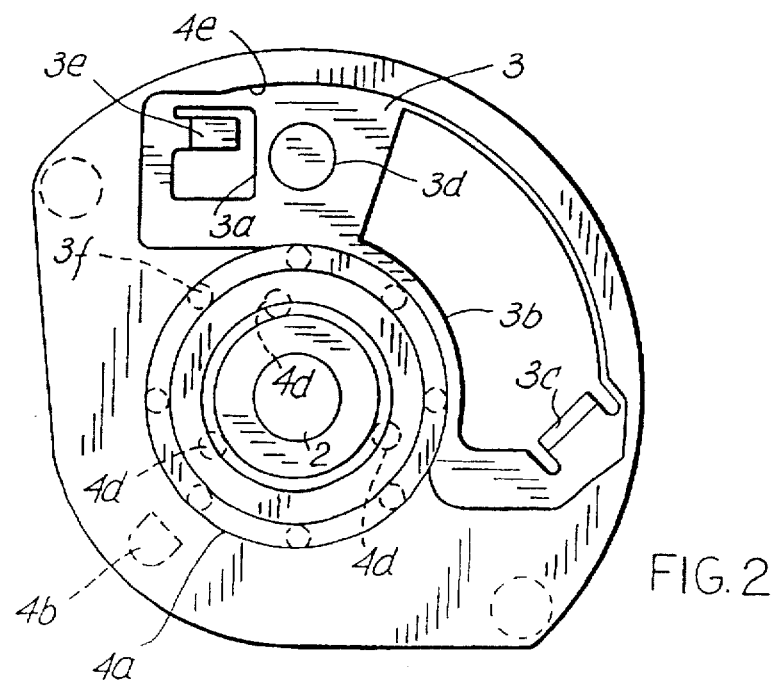
FIG. 2 is a plan view showing the magnified vicinity of a shaft applied in the floppy disk drive motor.
Figure 3:
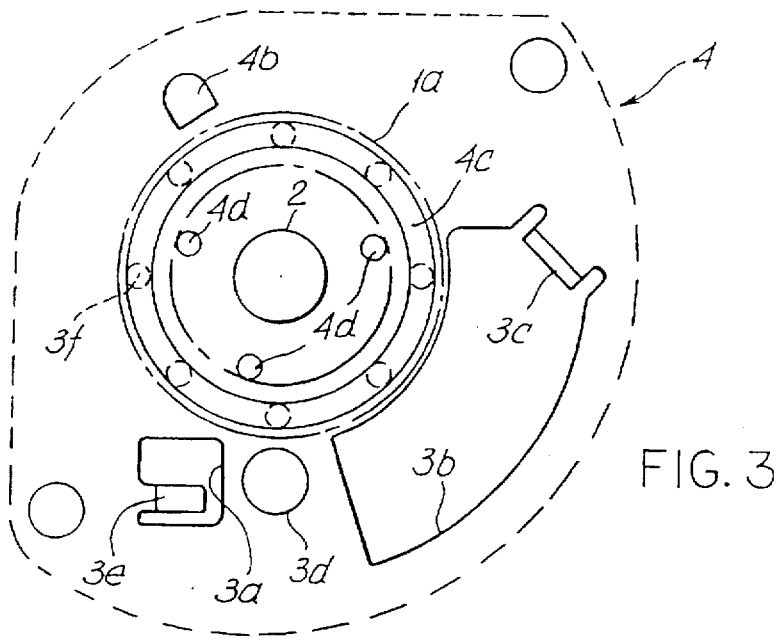
FIG. 3 is a bottom view showing the magnified vicinity of the shaft applied in the floppy disk drive motor.
Figure 4:
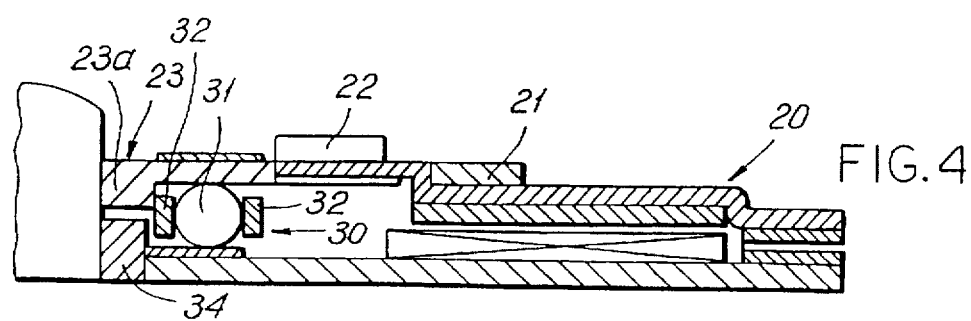
FIG. 4 is a cross-sectional view showing an example of a conventional floppy disk drive motor.

Embodiments of a floppy disk driving motor of this invention is described hereinafter referring to the drawings. FIG. 1 (A) shows a cross section of the entire motor; FIG. 1 (B) shows a magnified cross section of a key section; FIG. 2 shows a partially magnified plan view seen from the top of rotor; FIG. 3 shows a partially magnified plan view seen from the bottom of rotor. In FIG. 1, a substrate 11 has a hole 11a at the center, and the bottom edge of a radial bearing 5 is fitted thereto. The radial bearing 5, constituted of, for example, an oil impregnated sintered bearing in a cylindrical shape, has a caulked section at the bottom. The caulked section is adhered to the edge of the hole 11a on the substrate 11, and thereby the radial bearing 5 is fixed onto the substrate 11.

A thrust ball bearing 1 is provided, outside the radial bearing 5, on the substrate 11. The thrust ball bearing 1 consists of a plurality of balls 1b, washers 1a and 1a', which are arranged at the top and bottom so as to sandwich the balls and rotate relative to one another, and a retainer 1c for holding the plurality of balls 1b. The retainer 1c is annularly formed of silicon resin and the like; its inner circle is fitted to the outer circle of the radial bearing 5 such that those surfaces closely contact each other. Also, since the washer 1a' at the bottom is mounted onto the substrate 11, the washer 1a at the top is rotary with respect to the substrate 11.

A stator core 8 is mounted outside the thrust ball bearing 1 on the substrate 11. The stator core 8 has radial salient-poles on the outer circumference side by an even distance. The salient poles each consists of an umbrella section, which is formed at its end and extends circumferentially in both directions, and an arm section, which connects the umbrella section and the base of the stator core 8; a coil 9 is wound around the arm section. Further, the stator core 8 is constituted by laminating a magnetic core plate in plural. Regarding the core plates laminated in plural, the core plate at the bottom, i.e., the core plate loaded right above the substrate 11 has no salient poles; instead, it has a plurality of tongue pieces 8a projecting toward the inner circle. By arranging the core plate without salient-poles at the bottom of the stator core 8 in this manner, a space is created, by the thickness of the bottom core plate, between the salient pole and the substrate 11 so that a sufficient space is provided for winding coils. Screwed into the section where all the core plates are laminated is the incoming end of a screw 13 which is inserted through the bottom of the substrate 11; the stator core 8 is secured on the substrate 11 thereby. On the substrate 11, a rectangular frequency generation pattern (not illustrated) is formed outside the outer circle of the stator core 8. A floppy disk driving motor is constructed with these components such as substrate 11, stator core 8, etc. Further, on the substrate 11, a magnetic sensor 12 is mounted between the tongue pieces 8a and 8a.

The radial bearing 5 has a hole at its center, through which a shaft 2 is inserted. A cup-shaped rotor case 3 is attached to the outer circle surface of the radial bearing 5 above the section inserted into the hole of the radial bearing 5. The rotor case 3 has, at its center, a cylindrical boss section 3a projecting toward the radial bearing 5; the inner circle surface of the cylindrical boss section 3a is mounted with respect to the outer circle surface of the shaft 2.

On top of the rotor case 3 and outside the outer circle of the shaft 2 projecting upwardly from the boss section 3a, a chucking magnet 4 is provided by injection molding of outset mold and the like. The chucking magnet 4 is formed by integrally molding a resin magnet therewith. The resin magnet can be obtained by molding the material produced by tempering a magnetic powder with a resin binder.

The inner side of the chucking magnet 4 projects upwardly to be a hub seat 4a for loading a hub of a floppy disk. The back side of the hub seat 4a in the chucking magnet 4 projects downwardly passing through holes 3f of the rotor case 3 (eight holes in FIGS. 2 and 3), and the projected section is made to be a flatness control section 4c. The flatness control section 4c works such that it touches the top surface of the washer 1a of the thrust ball bearing 1 so as to support the rotor case 3 in the thrust direction with a predetermined flatness maintained. If a predetermined flatness is not maintained by the flatness control section 4c, the read/write condition of the floppy disk is affected, causing vibration on the surface.

Plural points (three points in FIG. 3) on the inner side than the flatness control section 4c integral with the chucking magnet 4 also project downwardly passing through the rotor case 3; the projected section is made to be a position control section 4d. The position control section 4d is projected such that its outer circumference is attachable to the inner circle surface of the washer 1a of the thrust ball bearing 1 (the member shown by one-dot chain line at the center of FIG. 3), so that it prevents the washer 1a from shifting in the radial direction. For this reason, when the rotor is loaded on the thrust ball bearing 1, it can rotate highly accurately with the flatness control section 4c integrally molded with the chucking magnet 4. Also, the position control section 4d determines the position of the washer 1a in the radial direction.

Further, one particular point at the bottom of the chucking magnet 4 projects downwardly passing through the rotor case 3; this point is magnetized to be an position sensing index magnet 4b. The aforementioned magnetic sensor 12 is positioned opposite the orbit of the index magnet 4b, which is generated while the rotor case 3 rotates. The rotation of the rotor case 3 causes magnetic flux of the index magnet 4b to cross the magnetic sensor 12 so that the position can be sensed during rotation of the floppy disk driving motor.

In addition, as shown in FIG. 2, provided to the chucking magnet 4 which is positioned above the rotor case 3 is a partial arc shaped, elongated hole 4e along the outer periphery of the hub seat 4a. A hole 3g is formed on the top surface of the rotor case 3 exposed out of the elongated hole 4e. In the hole 3g, an inwardly extended tongue piece 3e is provided. In the same manner, at the portion of the rotor case 3 exposed out of the elongated hole 4e of the chucking magnet 4, a partial arc shaped hole 3b is provided along the outer periphery of the hub seat 4a; a tongue piece 3c is provided at one end of the hole 3b.

A lever (not illustrated) is attached to the elongated hole 4e such that it swings pivoting around a fulcrum 3d. The swing range of the lever is controlled with one end by the tongue piece 3e and the other end by the tongue piece 3c. The drive pin 10, when a disk hub of the floppy disk is loaded on the hub seat 4a, engages with a drive hole provided on the disk hub to rotate the floppy disk.

The rotor case 3 has a peripheral wall around its outer circumference; a drive magnet 14 is mounted via a yoke 7 on the inner surface of the peripheral wall. The drive magnet 14 is annular; its inner circle surface faces the edge surfaces of the salient-poles of the stator core 8 mounted on the substrate 11 at a predetermined distance. Therefore, by conducting the coil 9 wound around the salient-poles of the stator core 8, the drive magnet 14 is magnetically energized circumferentially, and the rotor case 3, chucking magnet 4, hub seat 4a, shaft 2, etc. are rotated together. The rotor consists of these members.

Mounted on the outer circle surface of the peripheral wall of the rotor case 3 is a frequency generation magnet 6 having a plurality of magnetic poles. The frequency generation magnet 6 faces the frequency generation pattern (not illustrated) on the substrate 11, and puts out frequency signals from the frequency generation pattern, being rotated with the rotor case 3. The rotation of the motor is controlled based on the frequency signal and position sensing signal.

According to the floppy disk drive motor configured in such a way, the chucking magnet 4 is formed, on the rotor case 3, by injection molding the resin magnet made by tempering magnetic powder with resin binder. Further, the chucking magnet 4, the flatness control section 4c which controls the flatness of the hub seat 4a and the washer 1a by contacting the washer 1a of the thrust ball bearing 1, and the position control section 4d which controls the washer 1a in the radial direction by contacting the inner circle surface of the washer 1a are integrally molded. For this reason, a flatness controlling member, a position control member for controlling the washer in the radial direction, etc. do not need to be prepared separately, thus reducing the number of the components, material cost, and manufacturing cost.

The chucking magnet 4 also has the flatness control section 4c and position control section 4d for controlling the position of the washer 1a; therefore, the rotor can be accurately mounted with respect to the thrust ball bearing 1, thus improving the rotational accuracy of the rotor. Moreover, the inner circle surface of the retainer 1c of the thrust ball bearing 1 and the outer circle surface of the radial bearing 5 are arranged such that their surfaces contact sufficiently; therefore, the rotation orbit of the retainer 1c and the rolling orbit of the ball 1b are stabilized, providing a highly accurate rotation.

Furthermore, since the flatness control section 4c for the washer 1a is formed onto the rotor case 3 which is integral with the shaft 3, the flatness of the hub seat 1a, a medium loading surface, can be easily provided.

In the above embodiments, the chucking magnet 4 and the hub seat 4a are integrally molded; however, this invention is not limited to this embodiment. The hub seat 4a may be formed as an independent member from the chucking magnet 4.

Also, the frequency generation magnet 6, which is provided on the outer circle surface of the peripheral wall of the rotor 3 may be molded with the chucking magnet 4 of the same material. Even this construction can reduce the number of the components, material cost, and manufacturing cost. In addition, the position sensing magnet 4b may be constructed as an independent member from the chucking magnet 4.

The above embodiment showed an example in which this invention is applied in a motor in which a magnetic force flows circumferentially; however, it is understood, of course, that this invention can be applied to a motor in which a magnetic force flows vertically between surfaces.

According to this invention, a chucking magnet, a flatness control section for a washer, and a position control section for controlling the washer in the radial direction are integrally molded; therefore, a flatness controlling member, a position control member for controlling the washer in the radial direction, etc. do not need to be separately provided, thus reducing the number of the components, material cost, and manufacturing cost. Since the flatness control section and the position control section are provided on the chucking magnet, the rotor can be accurately mounted with respect to the thrust ball bearing, improving the rotational accuracy. Moreover, forming the flatness control section for the washer on the rotor case improves the flatness of the hub seat for loading a medium.

While the foregoing description and drawings represent the preferred embodiments of the present invention, it will be obvious to those skilled in the art that various changes and modifications may be made therein without departing from the true spirit and scope of the present invention.

What is claimed is:

1. A floppy disk driving motor comprising:

a rotor having a rotatably supported shaft;

a rotor case rotating together with said shaft;

a hub seat attached to said rotor case for mounting a disk hub and a chucking magnet for magnetically attracting said disk hub;

a thrust ball bearing having a washer, a plurality of balls, and a retainer for holding said balls and supporting the load in the thrust direction of said rotor;

a flatness control section, which passes through said rotor case to contact said washer of said thrust ball bearing and controls the flatness of said washer, a position control section, which passes through said rotor case to contact an inner circle surface of said washer of said thrust ball bearing and controls said washer in the thrust direction; and wherein said chucking magnet, flatness control section and position control section are integrally molded of resin.

2. The floppy disk driving motor as set forth in claim 1, wherein an index magnet is integrally molded on said chucking magnet such that it passes through said rotor case to project inside of said motor; a magnetic sensor being provided opposite said index magnet.

3. The floppy disk driving motor as set forth in claim 1, wherein said retainer for holding said balls of said thrust ball bearing is contactly fitted to the outer circle surface of a radial bearing which supports said shaft.

4. The floppy disk driving motor as set forth in claim 1, wherein said hub seat is integrally molded to said chucking magnet.

5. The floppy disk driving motor as set forth in claim 2, wherein said hub seat is integrally molded to said chucking magnet.

6. The floppy disk driving motor as set forth in claim 1, wherein said rotor has a frequency generation magnet having a plurality of magnetic poles; said frequency generation magnet being made of the same material as said chucking magnet.

* * * * *